(12) United States Patent
Xu et al.

(10) Patent No.: US 12,123,482 B2
(45) Date of Patent: Oct. 22, 2024

(54) LINEAR ACTUATOR WITH CONTACT TYPE SAFETY NUT, AND AERIAL WORK PLATFORM

(71) Applicant: ZHEJIANG DINGLI MACHINERY CO., LTD., Huzhou (CN)

(72) Inventors: Shugen Xu, Huzhou (CN); Zhong Xu, Huzhou (CN)

(73) Assignee: ZHEJIANG DINGLI MACHINERY CO., LTD., Huzhou (CN)

( * ) Notice: Subject to any disclaimer, the term of this patent is extended or adjusted under 35 U.S.C. 154(b) by 18 days.

(21) Appl. No.: 18/095,491

(22) Filed: Jan. 10, 2023

(65) Prior Publication Data

US 2024/0102542 A1    Mar. 28, 2024

(30) Foreign Application Priority Data

Sep. 24, 2022  (CN) .......................... 202211168553.9

(51) Int. Cl.
*F16H 25/24*   (2006.01)
*B66F 7/06*    (2006.01)
*F16H 25/20*   (2006.01)
*F16H 25/22*   (2006.01)

(52) U.S. Cl.
CPC ....... *F16H 25/2472* (2013.01); *B66F 7/0608* (2013.01); *B66F 7/0666* (2013.01); *F16H 25/205* (2013.01); *F16H 25/2247* (2013.01); *F16H 25/2454* (2013.01); *F16H 2025/2068* (2013.01); *F16H 2025/2271* (2013.01)

(58) Field of Classification Search
CPC .............. F16H 25/2472; F16H 25/205; F16H 25/2247; F16H 25/2454; F16H 2025/2068; F16H 2025/2271; B66F 7/0608; B66F 7/0666
See application file for complete search history.

(56) References Cited

U.S. PATENT DOCUMENTS 4,815,712 A * 3/1989 Kawada ................... B66F 3/46
                                                        187/211
2018/0045291 A1* 2/2018 Teyssier ................. B64C 13/28

FOREIGN PATENT DOCUMENTS

CN    113840794 A * 12/2021 ............ B66F 11/042

* cited by examiner

*Primary Examiner* — Terence Boes
(74) *Attorney, Agent, or Firm* — Olive Law Group, PLLC

(57) ABSTRACT

The present disclosure relates to the technical field of aerial work platforms, in particular to a linear actuator with a contact type safety nut, and an aerial work platform. The linear actuator includes a central screw, a driving nut mechanism, and a safety nut mechanism. The central screw has a screw raceway. The safety nut mechanism includes a safety nut seat sleeved at the periphery of the central screw. Limit hole channels pointing to the central screw are arranged on the safety nut seat. An elastic buffer element is arranged in each of the limit hole channels. A safety ball is arranged between the elastic buffer element and the central screw. The contact type safety nut enables the linear actuator to always keep safety, stability, and no loss of accuracy in a conversion process that the safety nut mechanism gets involved to take effect while the driving nut mechanism fails.

8 Claims, 11 Drawing Sheets

LINEAR ACTUATOR WITH CONTACT TYPE SAFETY NUT, AND AERIAL WORK PLATFORM

CROSS REFERENCE TO RELATED APPLICATION

This application claims priority to Chinese Patent Application No. 2022111685539, filed Sep. 24, 2022, the content of which is incorporated herein by reference in its entirety.

FIELD OF TECHNOLOGY

The present disclosure relates to the technical field of aerial work platforms, in particular to a linear actuator with a contact type safety nut, and an aerial work platform.

BACKGROUND

At present, linear actuators are widely used in various fields, including medical equipment, home office, solar power generation, and so on. In general, such linear actuator structurally includes a drive motor, a driving screw, a worm gear, and a driving nut. The drive motor drives a rotating screw to rotate, the rotating screw drives the driving nut to move axially during rotation, and the driving nut may be connected to a drive object, so as to achieve drive. During operation, the linear actuator needs to bear an axial force and a certain lateral force, such that the driving nut is damaged due to abnormal wear and material defects so as to descend suddenly, causing greater danger. To improve the safety performance in use, safety nuts are arranged in driving nuts of many linear actuators. The safety nut is arranged to only lower a push rod to a safety position, rather than to keep continuous operation of the push rod after a screw tooth or ball of the driving nut is damaged. When the driving nut operates normally, the safety nut does not take effect, so the safety nut is usually not connected to the screw at this time. When the driving nut is damaged during ascending, the linear actuator will not continue ascending, but will rotate at an original position. If the motor rotates reversely, the linear actuator may return to the safety position under the driving of the safety nut.

Because the safety nut is connected to the screw to take effect only when the screw fails, the safety nut does not take effect when a screw lifter operates normally, and the safety nut will not be connected to the screw, such that normal operation of the screw lifter is not affected. As disclosed in the patent with the publication number of CN113840794A, a lifting apparatus includes a central screw, a main nut mechanism, and an auxiliary nut mechanism, where the main nut mechanism is connected to the central screw, and the auxiliary nut mechanism is separated from the central screw. When the main nut mechanism fails, the auxiliary nut mechanism is configured to be connected to the central screw, which avoids danger caused by rapid descending of the lifting apparatus; and then, a lifting controller is configured to allow a work platform to descend to a retraction or transport position, so as to allow a worker or an operator to safely leave a carrier. When the main nut mechanism fails, the auxiliary nut mechanism in the patent can be connected to the central screw to ensure the safety, but when the main nut mechanism operates normally, the auxiliary nut mechanism is always separated from the central screw. Therefore, at the moment when the auxiliary nut mechanism is connected to the central screw, more violent impact will occur, which may cause damage to the central screw and the auxiliary nut mechanism, and cause the actuator to vibrate more violently, such that the lifted platform will also vibrate to endanger the safety of personnel on the platform. In addition, after the auxiliary nut mechanism acts, the lifting apparatus does not directly remain stationary at the current position to wait for maintenance, and the actuator still needs to operate to complete a current lifting task or at least needs to descend to a safety height. The auxiliary nut mechanism is connected to the central screw via screw threads, specifically it is close to and connected to the central screw along an axial direction of the central screw. Although an original gap is not large, the actuator still has an obvious position error in the axial direction of the central screw after connection, resulting in a larger error of entire lifting control.

SUMMARY

In view of the above problems existing in the prior art, the present disclosure makes an improvement, namely, to solve the technical problems, the present disclosure provides a linear actuator with a contact type safety nut, including a central screw, a driving nut mechanism, and a safety nut mechanism, where the central screw has a screw raceway, the safety nut mechanism includes a safety nut seat sleeved at the periphery of the central screw, limit hole channels pointing to the central screw are arranged on the safety nut seat, an elastic buffer element is arranged in each of the limit hole channels, a safety ball is arranged between the elastic buffer element and the central screw, the safety ball partially extends into the screw raceway to be partially positioned in the corresponding limit hole channel, and the safety ball is capable of rolling along the screw raceway and moving along the corresponding limit hole channel. In the present disclosure, the elastic buffer element and the safety ball form an elastic ball mechanism, and the safety nut mechanism always keeps connection with the central screw via the elastic ball mechanism. The driving nut mechanism is, for example, a conventional ball screw nut, which converts rotary actuation of the central screw into a translational motion. In a normal working state that the driving nut mechanism does not fail, compared to the prior art that the safety nut mechanism is kept separated from the central screw at this time, the safety nut mechanism in the present disclosure always keeps elastic connection with the central screw via the specially structured elastic ball mechanism, that is, the contact type safety nut. When the driving nut mechanism fails, the elastic ball mechanism does not affect engaged connection between the safety nut mechanism and the central screw.

As a preference of the present disclosure, the plurality of limit hole channels are arranged on the safety nut seat along a circumferential direction of the safety nut seat, and the elastic buffer element and the safety ball are arranged in each of the limit hole channels.

As a preference of the present disclosure, thread teeth are provided on an inner wall of the safety nut seat, and the thread teeth extend into the screw raceway and are spaced from the central screw.

As a preference of the present disclosure, the limit hole channels are filled with oil, and a cross-sectional diameter of each of the limit hole channels is consistent with a diameter of the safety ball.

As a preference of the present disclosure, the limit hole channels pass through inner and outer side walls of the safety nut seat, the safety ball blocks an outlet of the corresponding limit hole channel close to the central screw, a plunger is detachably installed at an inlet of each of the limit hole channels far away from the central screw, the plunger blocks the inlet of the corresponding limit hole channel, and the elastic buffer element is positioned between the plunger and the safety ball.

As a preference of the present disclosure, a gap is provided between the safety nut seat and the driving nut mechanism, and forms an oil supplementing cavity, the oil supplementing cavity surrounds the central screw, and transfer hole channels for communication between the limit hole channels and the oil supplementing cavity are arranged in the safety nut seat.

As a preference of the present disclosure, the limit hole channels are arranged in a circular array along the circumferential direction of the safety nut seat.

As a preference of the present disclosure, the outlets of all the limit hole channels are arranged on the thread teeth along a screw extension direction of the thread teeth.

As a preference of the present disclosure, the elastic buffer element is a spring, and a diameter of the spring is smaller than a diameter of the safety ball.

An aerial work platform includes the linear actuator with a contact type safety nut.

The beneficial effects are as follows:

The design of the contact type safety nut enables the linear actuator to always keep safety, stability, and no loss of accuracy in a conversion process that the safety nut mechanism gets involved to take effect while the driving nut mechanism fails.

BRIEF DESCRIPTION OF THE DRAWINGS

FIG. 11 is a schematic diagram of an upper connection end, in which:

Figure 1:
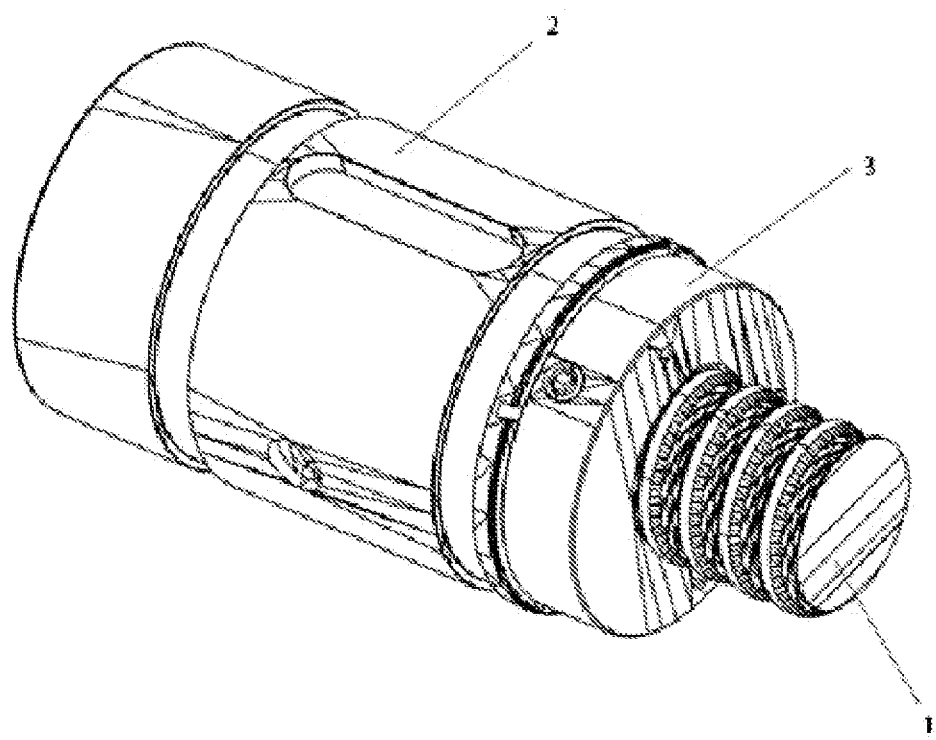
FIG. 1 is a schematic diagram of a three-dimensional structure that a driving nut mechanism and a safety nut mechanism are installed on a central screw.
Figure 2:
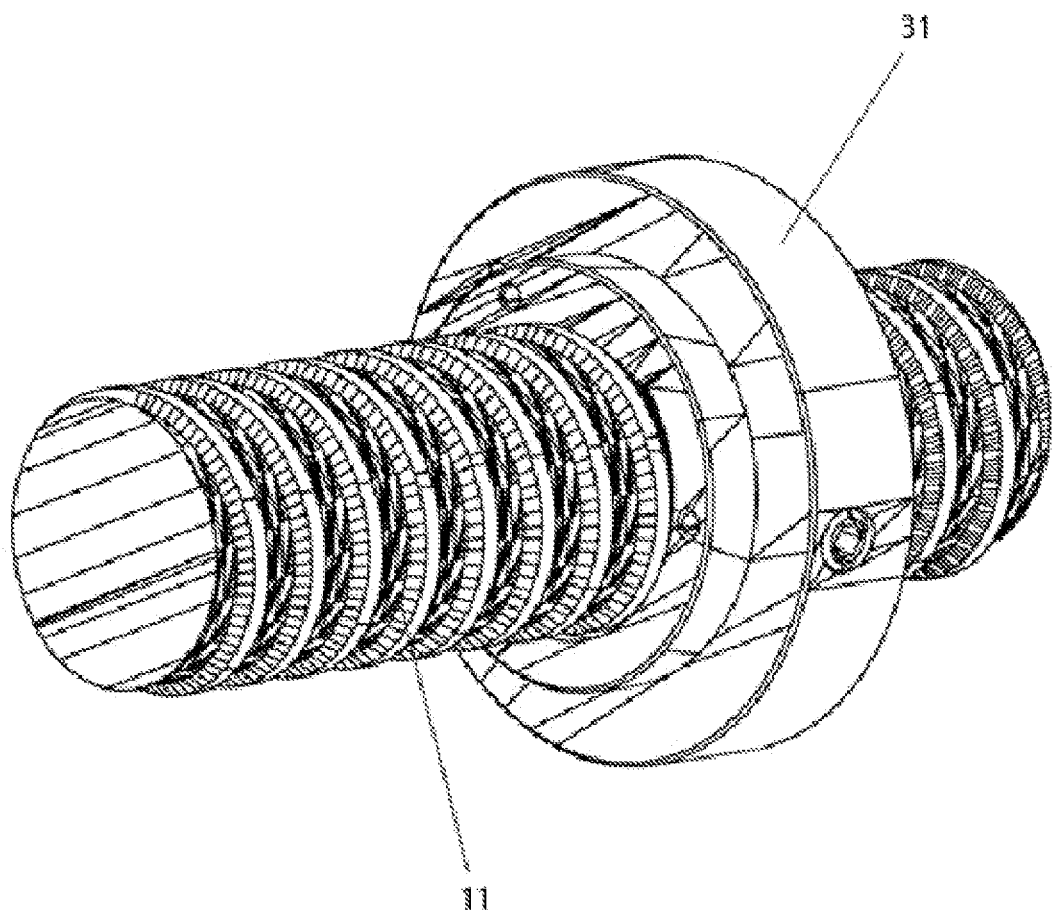
FIG. 2 is a schematic diagram of a safety nut seat and a central screw.
Figure 3:
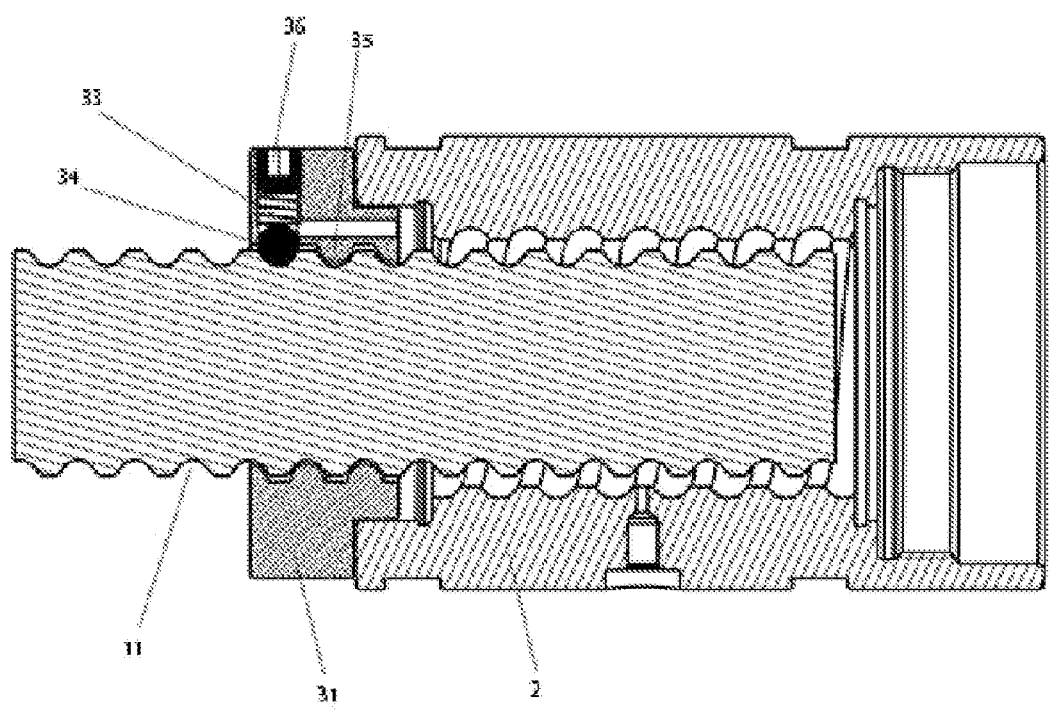
FIG. 3 is a sectional view of FIG. 1.
Figure 4:
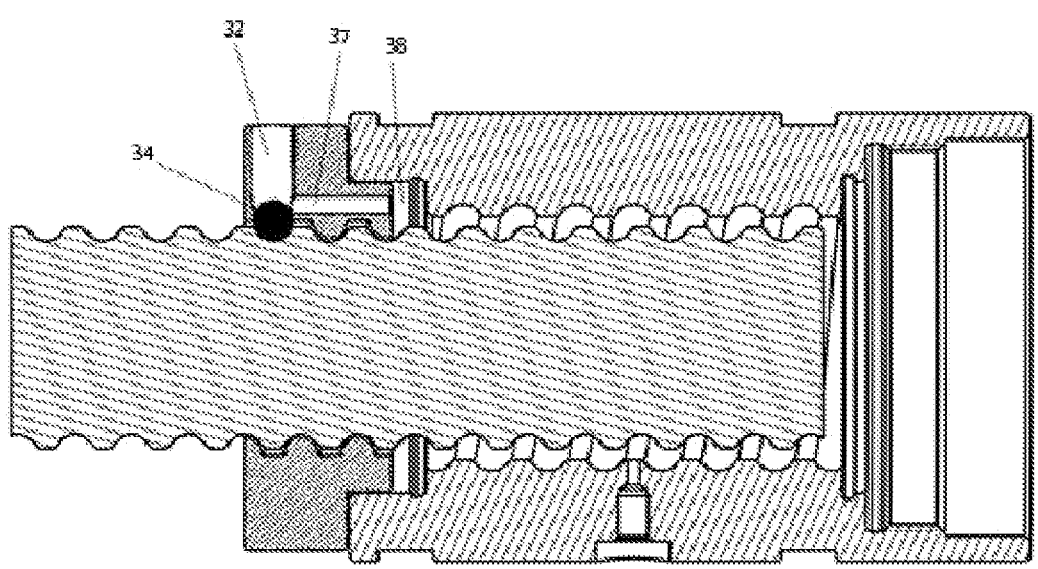
FIG. 4 is a schematic diagram of FIG. 3 in which a plunger and an elastic buffer element are omitted.
Figure 5:
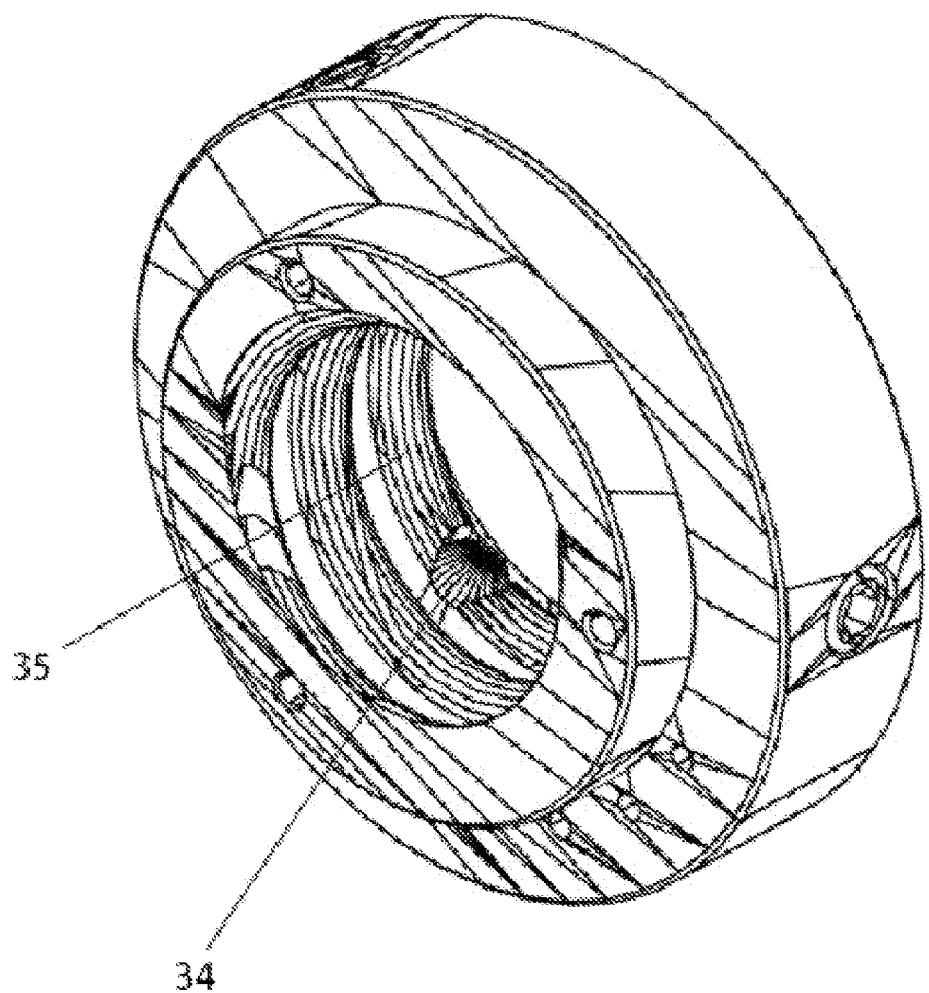
FIG. 5 is a schematic diagram that outlets of limit hole channels are positioned on thread teeth.
Figure 6:
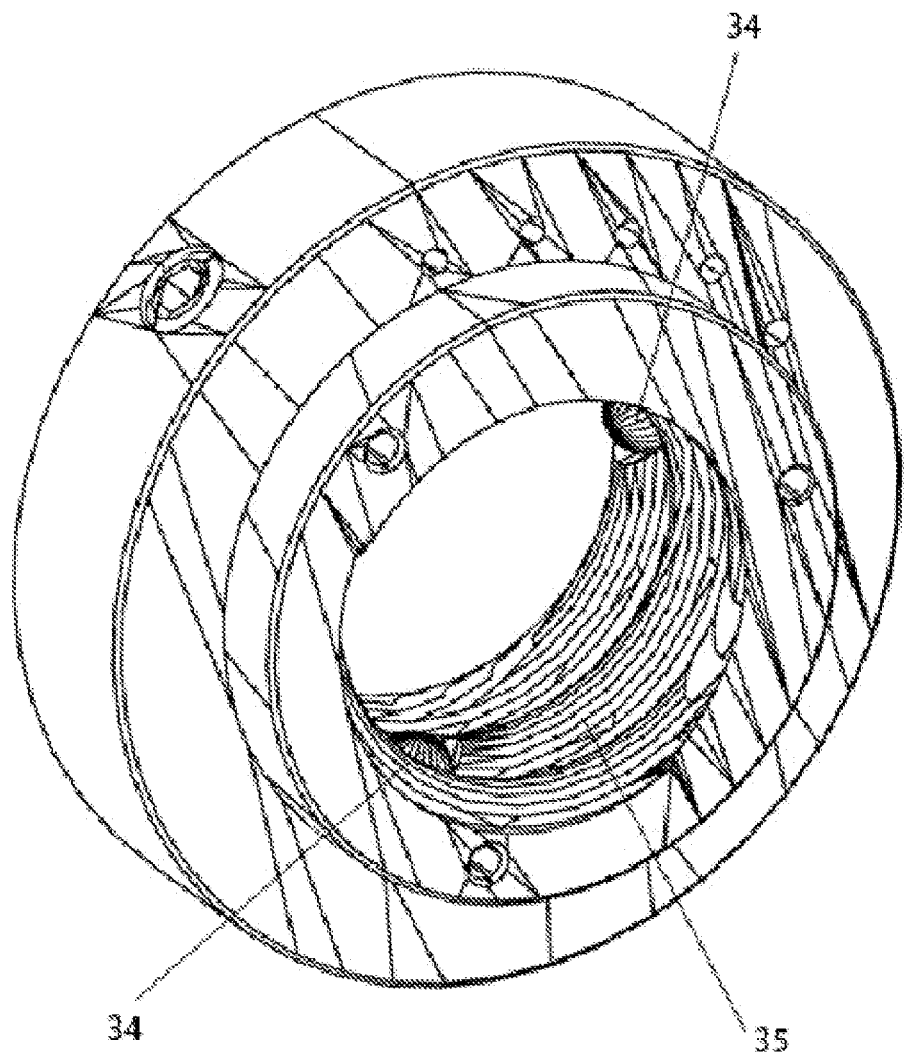
FIG. 6 is a schematic diagram that outlets of all limit hole channels are arranged on thread teeth along a screw extension direction of the thread teeth.
Figure 7:
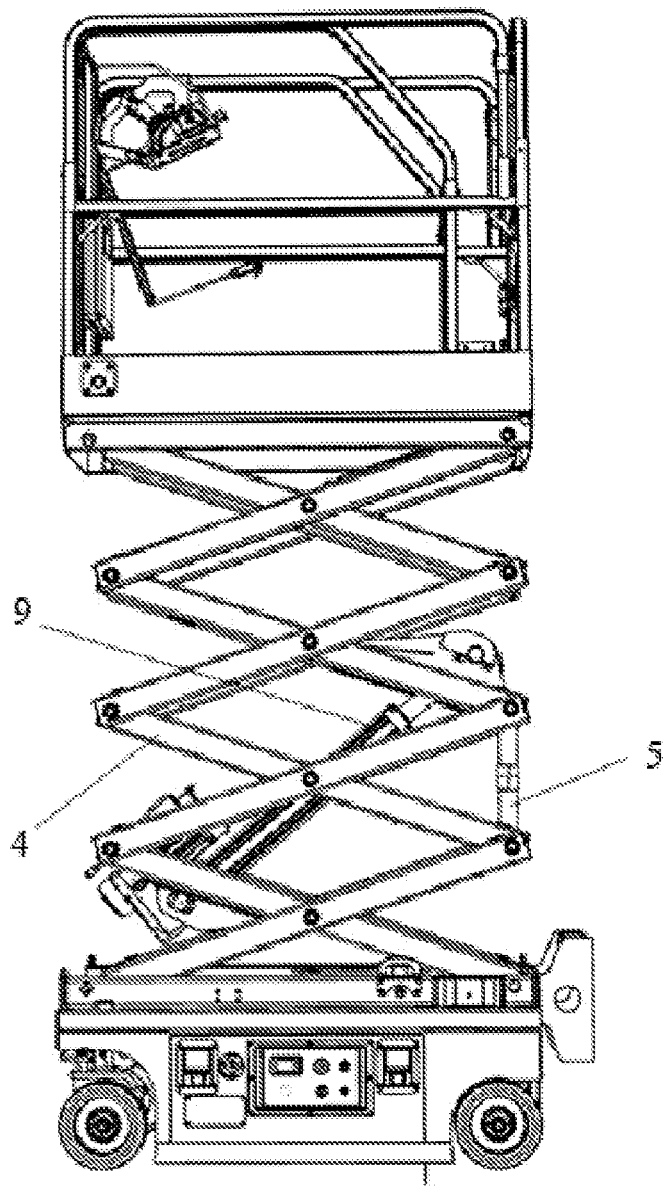
FIG. 7 is a schematic diagram of an overall structure of scissors lifting equipment.
Figure 8:
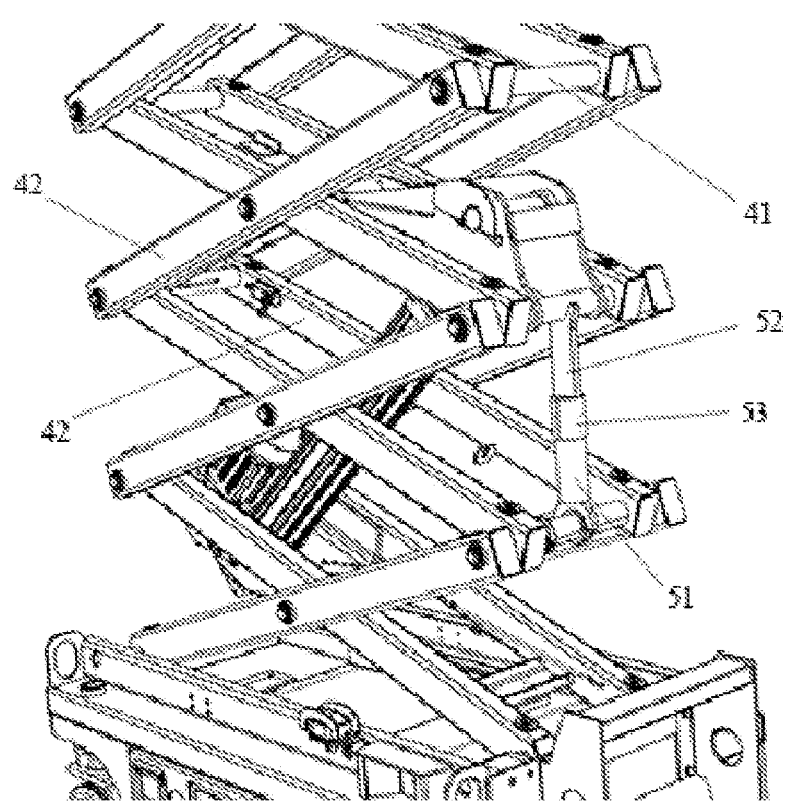
FIG. 8 is a schematic diagram of a hydraulic buffer in operation.
Figure 9:
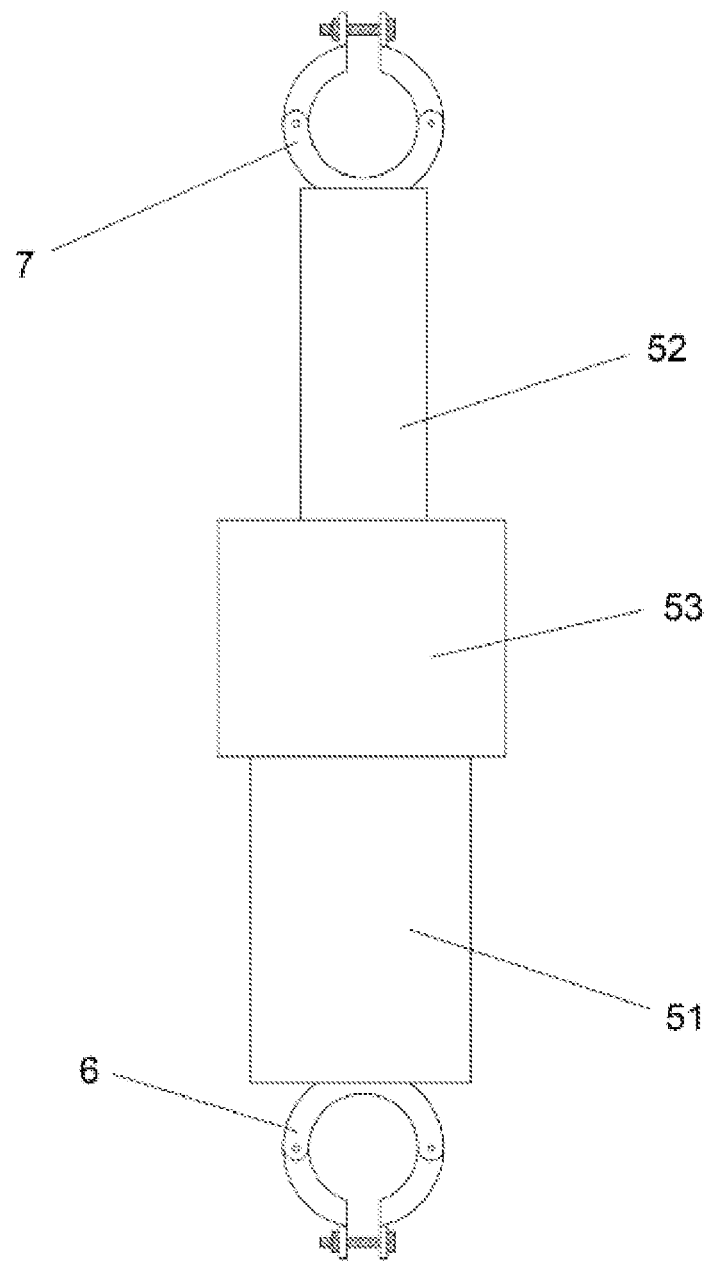
FIG. 9 is a schematic structural diagram of the hydraulic buffer.
Figure 10:
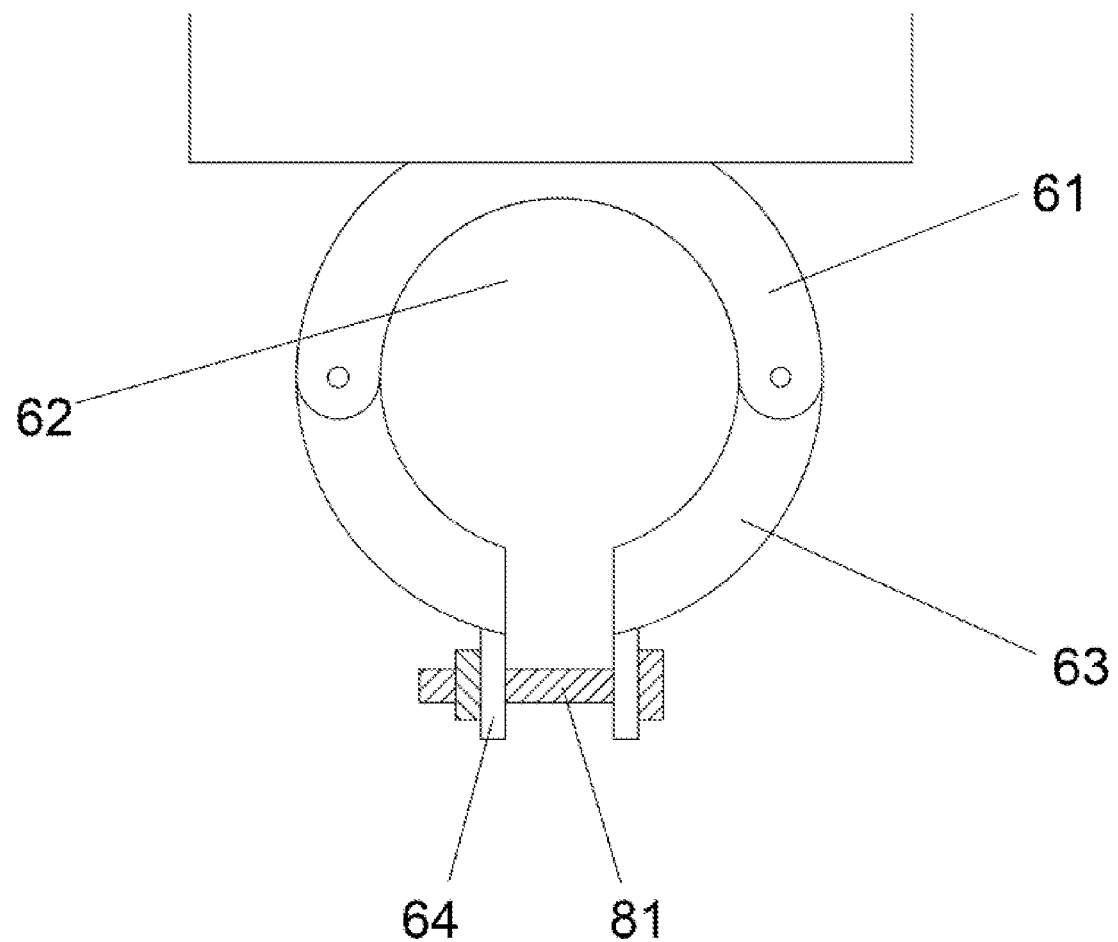
FIG. 10 is a schematic diagram of a lower connection end.
Figure 11:
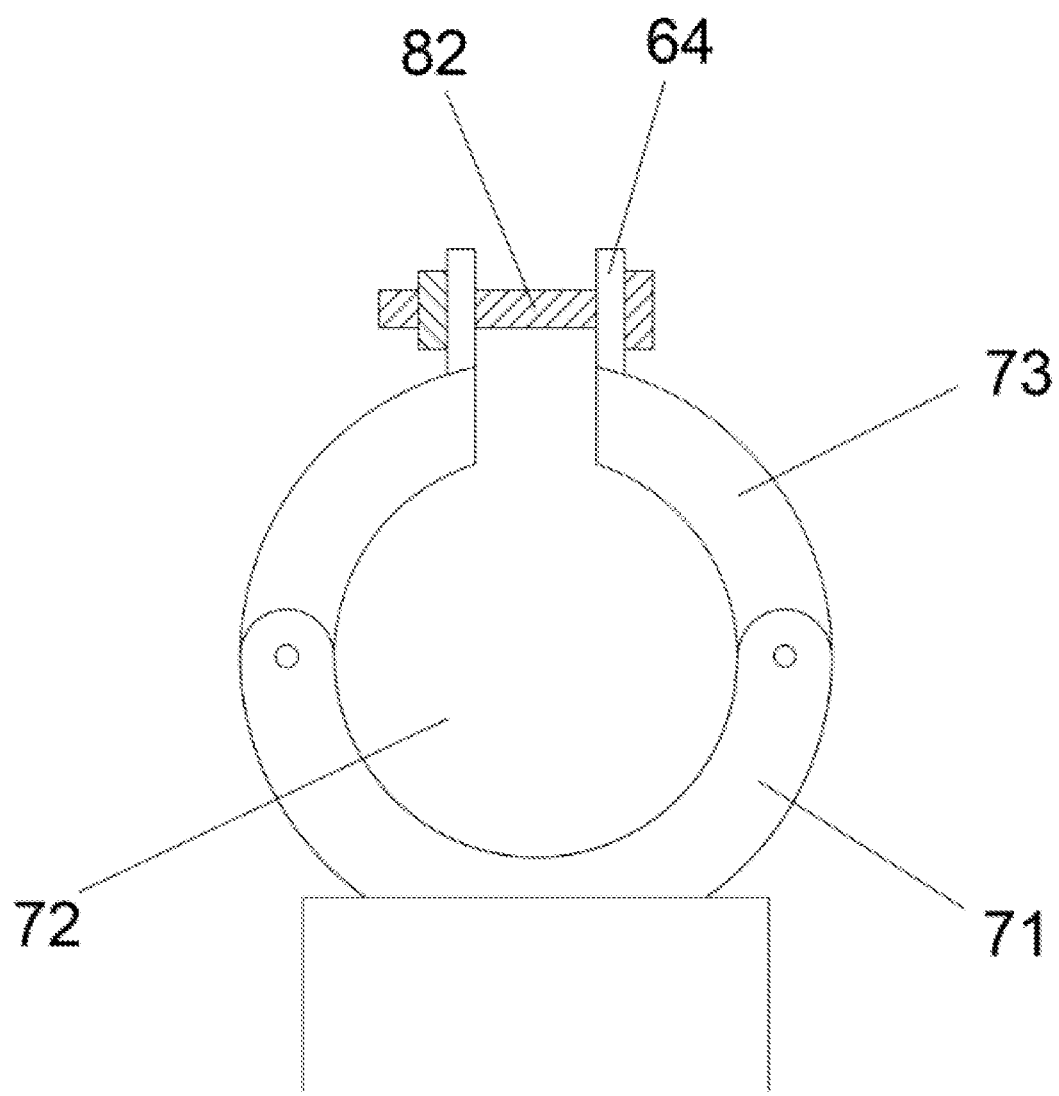

1: central screw; 11: screw raceway; 2: driving nut mechanism, 3: safety nut mechanism; 31: safety nut seat; 32: limit hole channel; 33: elastic buffer element; 34: safety ball; 35: thread teeth; 36: plunger; 37: transfer hole channel; 38: oil supplementing cavity; 4: scissors mechanism; 41: transverse support rod; 42: scissors frame; 5: hydraulic buffer; 51: hydraulic cylinder; 52: piston rod; 53: dust cover; 6: lower connection end; 61: lower arc-shaped seat; 62: lower arc groove; 63: lower opening and closing portion; 64: installation piece; 7: upper connection end; 71: upper arc-shaped seat; 72: upper arc groove; 73: upper opening and closing portion; 81: lower fastener; 82. upper fastener; and 9: lifting mechanism.

DESCRIPTION OF THE EMBODIMENTS

The specific embodiments below only illustrate rather than limiting the present disclosure. Upon reading this specification, those skilled in the art may make modifications to the embodiments without creative contributions as needed, but the modifications are protected by the patent law as long as they are within the scope of the claims of the present disclosure.

Embodiment 1

A linear actuator with a contact type safety nut according to the present disclosure includes a central screw 1, a driving nut mechanism 2, and a safety nut mechanism 3, where the central screw 1 has a screw raceway 11, the safety nut mechanism 3 includes a safety nut seat 31 sleeved at the periphery of the central screw 1, there is no contact between the safety nut seat 31 and the central screw 1, limit hole channels 32 pointing to the central screw 1 are arranged on the safety nut seat 31, an elastic buffer element 33 is arranged in each limit hole channel 32, and a safety ball 34 is arranged between the elastic buffer element 33 and the central screw 1; one end of the elastic buffer element 33 far from the safety ball 34 can be supported, specifically it may be fixedly connected to an inner wall of the limit hole channel 32, or one end of the limit hole channel 32 far from the central screw 1 is not connected such that there exists a bottom surface, and the elastic buffer element 33 directly abuts on this bottom surface; and the safety ball 34 partially extends into the screw raceway 11 to be partially positioned in the corresponding limit hole channel 32, the safety ball 34 is capable of rolling along the screw raceway 11 and moving along the limit hole channel 32, the safety ball 34 is fully attached to the screw raceway 11, and the safety ball 34 can stably roll in the screw raceway 11. When the linear actuator is in normal operation, the driving nut mechanism 2 plays a major role in driving, the safety nut mechanism 3 does not take effect but still needs to move together with a driving nut. Only the safety ball 34 in the safety nut mechanism 3 extends into the screw raceway 11 of the central screw 1 and can roll along the screw raceway 11, and the rest of parts in the safety nut mechanism 3 do not contact with the central screw 1, but the safety nut mechanism 3 is connected to the central screw 1 via the safety ball 34. The safety ball 34 is positioned between the elastic buffer element 33 and the central screw 1. When subjected to an external force, the safety ball 34 can overcome an elastic force of the elastic buffer element 33 to move in the limit hole channel 32. Therefore, the safety ball 34 is not tightly pressed in the screw raceway 11, and only rolls along the screw raceway 11. As a result, the existence of the safety ball 34 will not affect normal operation of the driving nut mechanism 2. When the driving nut mechanism 2 fails, it is usually caused by the loss of the ball in the driving nut mechanism 2. At this time, along an axial direction of the central screw 1, the safety ball 34 in the safety nut mechanism 3 is tightly pressed on a side wall of the screw raceway 11, and the safety ball 34 is fully attached to the screw raceway 11, so the safety ball 34 does not move in the axial direction, and there is no instantaneous violent impact between the safety ball 34 and the central screw 1 at the moment of taking effect, thereby ensuring the stability of the entire linear actuator, and avoiding damage to the safety ball 34 and the central screw 1. In addition, the safety ball 34 is partially positioned in the limit hole channel 32, so the axial movement of the safety nut seat 31 can be restricted by clamping the limit hole channel 32, the safety nut mechanism 3 will not cause the linear actuator to produce a position error in the axial direction when it works, and the safety ball 34 replaces the lost ball in the driving nut mechanism 2 at this time to temporarily playing a driving role. In this way, the linear actuator can also complete a current lifting task or descend to a safety height. In short, it can also ensure the accuracy of operation, and the accuracy does not need to be rechecked when the driving nut mechanism 2 is replaced subsequently. In a side direction perpendicular to the axial direction of the central screw 1, the safety nut seat 31 is extruded towards the central screw 1, the safety ball 34 will overcome the elastic force of the elastic buffer element 33 to move towards the interior of the limit hole channel 32, and the elastic buffer element 33 plays a buffering role to avoid violent vibration of the safety nut mechanism 3 and the linear actuator, and to ensure the safety of the lifting equipment. However, in this direction, the safety ball 34 cannot be tightly pressed in the screw raceway 11, and the safety nut seat 31 is directly pressed on the central screw 1 to achieve locking of the central screw 1 by the safety nut mechanism 3, thereby ensuring the safety. In short, the design of a contact type safety nut enables the linear actuator to always keep safety, stability, and no loss of accuracy in a conversion process that the safety nut mechanism 3 gets involved to take effect while the driving nut mechanism 2 fails.

In this embodiment, the limit hole channel 32 points to the central screw 1, and a specific extension direction of the limit hole channel 32 is perpendicular to the axial direction of the central screw 1. There is only one safety ball 34 in each limit hole channel 32 of the safety nut mechanism 3, so to ensure the overall effect of the safety nut, in this embodiment, preferably a plurality of the limit hole channels 32 are arranged on the safety nut seat 31 along a circumferential direction of the safety nut seat, and the elastic buffer element 33 and the safety ball 34 are arranged in each limit hole channel 32. In this embodiment, the safety nut mechanism 3 resists a lateral force mainly by relying on direct extrusion of the safety nut seat 31 and the central screw 1, and plays a locking role. However, an inner wall of the safety nut seat 31 and the central screw 1 are smoothly attached to each other. When the lateral force is smaller, the locking effect is general, and the axial locking effect is very general. Therefore, in this embodiment, preferably thread teeth 35 are provided on the inner wall of the safety nut seat 31, and the thread teeth 35 extend into the screw raceway 11 and are spaced from the central screw 1. When the driving nut mechanism 2 operates normally, the thread teeth 35 do not contact with the central screw 1; and when the driving nut mechanism 2 fails, the safety ball 34 still plays the above role, while the safety nut seat 31 no longer directly extrudes the central screw 1, but is extruded in the screw raceway 11 of the central screw 1 via the thread teeth 35, such that the thread teeth 35 can directly compress the central screw 1 in the side direction and has good locking effect, and it can also share the load of the safety ball 34 in the axial direction, thereby ensuring the strength and reliability of the safety nut mechanism 3.

When the driving nut mechanism 2 operates normally, the safety ball 34 is not tightly pressed in the screw raceway 11 but rolls in the screw raceway 11, so the normal operation of the driving nut mechanism 2 will not be impacted to a greater extent. However, a frictional force between the safety ball 34 and the screw raceway 11 will still slightly impact the normal operation of the driving nut mechanism 2, especially the operating efficiency, accuracy and energy consumption. Therefore, in this embodiment, preferably the limit hole channels 32 are filled with oil, a cross-sectional diameter of each of the limit hole channels 32 is consistent with a diameter of the safety ball 34, an outer ring of the safety ball 34 is fully attached to the inner wall of the limit hole channel 32, the effect of clamping the limit hole channel 32 by the safety ball 34 to restrict the safety nut seat 31 is good, the movement of the safety ball 34 in the limit hole channel 32 is fully restricted by the limit hole channel 32, which is very stable, and the safety ball 34 blocks the limit hole channel 32 to prevent the oil from flowing out of the limit hole channel 32 directly; and the oil is in direct contact with the surface of the safety ball 34, the safety ball 34 with the oil on the surface rolls in the screw raceway 11, and the oil plays a lubricating role to reduce the frictional force between the safety ball 34 and the screw raceway 11, thereby further reducing the impact of the safety nut mechanism 3 on the normal operation of the driving nut mechanism 2. In addition, the oil in the limit hole channel 32 can also buffer the safety ball 34 to a certain extent, thereby further improving the shock absorption effect.

According to a further improvement, in this embodiment, preferably the limit hole channels 32 pass through inner and outer side walls of the safety nut seat 31, the safety ball 34 blocks an outlet of the corresponding limit hole channel 32 close to the central screw 1, a plunger 36 is detachably installed at an inlet of each of the limit hole channels 32 far away from the central screw 1, the plunger 36 blocks the inlet of the corresponding limit hole channel 32, and the elastic buffer element 33 is positioned between the plunger 36 and the safety ball 34. The design of the limit hole channel 32 penetrated and the plunger 36 can facilitate the installation of the elastic buffer element 33 and the safety ball 34, as well as the filling of the oil. During installation, firstly the safety nut seat 31 is installed, then the safety ball 34 and the elastic buffer element 33 are put into the limit hole channel 32 in sequence, next the oil is filled, and finally the plunger 36 is installed in the inlet of the limit hole channel 32 for blockage. The installation is very convenient, and the elastic buffer element 33, the safety ball 34, and the safety nut seat 31 do not need to be manufactured together during production and manufacturing, which reduces the manufacturing and maintenance costs. The oil will continue to lose during use. When the oil needs to be added, the plunger 36 is removed, then the oil is supplemented and filled, and the plunger 36 is installed for continuous use. Preferably the plunger 36 is in threaded connection with the limit hole channel 32.

The thread teeth 35 effectively improve the locking capability of the safety nut mechanism 3, but in actual operation, when the safety nut mechanism 3 takes effect, the linear actuator is still required to operate to complete the current lifting task or to descend to the safety height, so under the action of a driving force, the thread teeth 35 on the safety nut mechanism 3 are required to slide along the screw raceway 11 to achieve the movement of the safety nut mechanism 3. In this embodiment, preferably there is a gap between the safety nut seat 31 and the driving nut mechanism 2, and an oil supplementing cavity 38 is formed. The oil supplementing cavity 38 surrounds the central screw 1. Transfer hole channels 37 for communication between the limit hole channels 32 and the oil supplementing cavity 38 are arranged in the safety nut seat 31. During oil filling, the limit hole channels 32, the transfer hole channels 37, and the oil supplementing cavity 38 are filled with the oil. The oil in the oil supplementing cavity 38 flows directly into the screw raceway 11 of the central screw 1 to reduce the frictional force between the thread teeth 35 and the screw raceway 11, such that the safety nut mechanism 3 can more easily move along the central screw 1 under the driving force when it works.

In this embodiment, preferably the limit hole channels 32 are arranged in a circular array along the circumferential direction of the safety nut seat 31, which refers to a planar arrangement of the limit hole channels 32 in a viewing angle along the axial direction of the central screw 1. In fact, these limit hole channels 32 may be spaced along the axial direction of the central screw 1, and are not arranged on one cross section. According to a further improvement, in this embodiment, preferably the outlets of all the limit hole channels 32 are arranged on the thread teeth 35 along a screw extension direction of the thread teeth 35, such that all the safety balls 34 are arranged along the screw extension direction of the thread teeth 35, and the safety balls 34 and the thread teeth 35 are combined with each other, together play respective roles at the same position of the screw raceway 11, and simultaneously play axial and lateral locking roles at the same position, thereby improving the locking effect. In this embodiment, the elastic buffer element 33 is a spring with the diameter smaller than the diameter of the safety ball 34. The elastic buffer element and the safety ball do not need to be connected to each other, and can interact by directly abutting on each other, which is convenient for installation, and the force transmission effect is good.

An aerial work platform according to the present disclosure includes the linear actuator with the contact type safety nut. In the linear actuator, the safety nut mechanism 3 is safe and stable without loss of accuracy when it works, and can ensure that the aerial work platform can still be safe and stable with good accuracy when the linear actuator fails. The aerial work platform may be a scissors aerial work platform, an aerial work platform with a cargo loading table, or other common aerial work platform.

Embodiment 2

Scissors lifting equipment with a hydraulic buffer 5 for maintenance according to the present disclosure includes a hydraulic buffer 5 and a scissors mechanism 4, where the hydraulic buffer 5 includes a hydraulic cylinder 51 and a piston rod 52, the hydraulic cylinder 51 has a lower connection end 6, the piston rod 52 has an upper connection end 7, and the hydraulic buffer 5 can support the scissors mechanism 4 after being connected to the scissors mechanism 4 via the upper connection end 7 and the lower connection end 6. The hydraulic buffer 5 is used for support. When the scissors mechanism 4 applies a pressure to the hydraulic buffer 5, the piston rod 52 will be gradually pressed into the hydraulic cylinder 51. During the process, with characteristics of strong buffer capacity and load capacity of the hydraulic buffer 5, the hydraulic buffer 5, when supporting the scissors mechanism 4, not only is safe and stable, but also resists impact with buffer performance, thereby avoiding damage to the hydraulic buffer and the scissors mechanism 4. In addition, a maximum load that can be met is larger. In actual maintenance, only the hydraulic buffer 5 may even be used for support, without starting a lifting mechanism 9 to provide an additional support force, which can effectively save energy in the generally longer-time maintenance. In this embodiment, the hydraulic buffer 5 has the lower connection end 6 and the upper connection end 7 specially connected to the scissors mechanism 4, and the firmness of connection is good, which further ensures the safety.

The scissors mechanism 4 includes two groups of front and rear scissors frames 42 and transverse support rods 41 erected between the two groups of scissors frames 42, and the transverse support rods 41 are positioned on left and right sides of the scissors mechanism 4 and arranged along an up-down direction. When the scissors frames 42 extend, the transverse support rods 41 on the same side are far away from each other in the up-down direction, and when the scissors frames 42 retract, the transverse support rods 41 on the same side are close to each other in the up-down direction. The hydraulic buffer 5 is arranged between the upper and lower adjacent transverse support rods 41 in the transverse support rods 41 on one side, and is connected to the upper transverse support rod 41 and the lower transverse support rod 41 via the upper connection end 7 and the lower connection end 6. The whole scissors mechanism 4 is supported by supporting the two transverse support rods 41. The hydraulic buffer 5 may be damaged. The load capacity of the hydraulic buffer 5 required for different actual situations is also different. The two situations require replacement of the hydraulic buffer 5, so in this embodiment, a form of connection between the lower connection end 6 and the corresponding transverse support rod 41 is detachable fixation.

According to the specific form of connection between the hydraulic buffer 5 and the transverse support rods 41, in this embodiment, preferably the lower connection end 6 includes a lower arc-shaped seat 61, and the lower arc-shaped seat 61 has a lower arc groove 62 that can be fully attached to an outer wall of the corresponding transverse support rod 41 to achieve clamping; and lower opening and closing portions 63 are rotatably connected to two ends of the lower arc-shaped seat 61, the lower opening and closing portions 63 are arc-shaped and can be fully attached to the outer wall of the corresponding transverse support rod 41, lower fasteners 81 are connected to ends of the two lower opening and closing portions 63, and the lower fasteners 81 can pull the ends of the two lower opening and closing portions 63 towards each other to achieve locking. The lower arc-shaped seat 61 is an integrally formed part with higher structural strength and plays a major role in clamping and supporting. Each transverse support rod 41 is a circular rod. A shape of the lower arc groove 62 matches with a shape of the outer wall of the corresponding transverse support rod 41. The lower arc-shaped seat 61 half encloses the corresponding transverse support rod 41 via the lower arc groove 62, such that the clamping is stable and reliable. The lower opening and closing portions 63 enable the lower connection end 6 to completely hoop the corresponding transverse support rod 41, thereby further improving the firmness of connection. The lower fasteners 81 have a force to pull the ends of the two lower opening and closing portions 63 towards each other during the locking, such that the two lower opening and closing portions 63 tightly hoop the corresponding transverse support rod 41. During installation, the two lower opening and closing portions 63 are in an opened state. After the lower arc-shaped seat 61 is clamped with the corresponding transverse support rod 41, the two lower opening and closing portions 63 hoop the corresponding transverse support rod 41 and are locked with the lower fasteners 81.

When the two ends are in contact with each other after the two lower opening and closing portions 63 hoop the corresponding transverse support rod 41, there already is actually interference between the two. No matter how the lower fasteners 81 increase a locking force, it is difficult to act on the two lower opening and closing portions 63. Therefore, in this embodiment, preferably after the two lower opening and closing portions 63 are fully attached to the outer wall of the corresponding transverse support rod 41, there is a distance between the ends of the two lower opening and closing portions 63. In this way, when the lower fasteners 81 increase the locking force, a tight hooping force between the lower opening and closing portions 63 and the corresponding transverse support rod 41 can be increased, thereby further improving the locking effect. After locking, it is difficult for the lower connection end 6 to move relative to the corresponding transverse support rod 41, so it may be considered that a fixed state is achieved. Installation pieces 64 for installation of the lower fasteners 81 are provided at the ends of the lower opening and closing portions 63. The installation pieces 64 are in a vertical shape, while the locking force generated by the lower fasteners 81 is perpendicular to the installation pieces 64. The lower fasteners 81 pull the two installation pieces 64 to improve the transmission effect of the lower fasteners 81 on the locking force, thereby further improving the locking effect. Preferably each lower fastener 81 includes a bolt and a nut. A through hole for the bolt to pass through is formed in each installation piece 64. The bolt is simultaneously arranged in the through holes of the two installation pieces 64 in a penetration manner, and then the nut is screwed to generate the locking force.

In this embodiment, the upper connection end 7 includes an upper arc-shaped seat 71, and the upper arc-shaped seat 71 has an upper arc groove 72 that can be fully attached to the outer wall of the corresponding transverse support rod 41 to achieve clamping; and upper opening and closing portions 73 are rotatably connected to two ends of the upper arc-shaped seat 71, the upper opening and closing portions 73 are arc-shaped and can be fully attached to the outer wall of the corresponding transverse support rod 41, upper fasteners 82 are connected to ends of the two upper opening and closing portions 73, and the upper fasteners 82 can pull the ends of the two upper opening and closing portions 73 towards each other to achieve locking. The upper arc-shaped seat 71, the upper opening and closing portions 73, and the upper fasteners 82 are correspondingly consistent with the lower arc-shaped seat 61, the lower opening and closing portions 63, and the lower fasteners 81 in function and installation principle, respectively. Of course, it may be further preferred that there is also a distance between the ends of the two upper opening and closing portions 73 after the corresponding transverse support rod 41 is hooped, and installation pieces 64 for installation of the upper fasteners 82 are provided at the ends of the two upper opening and closing portions 73, so as to better play the locking role of the upper fasteners 82. The upper fasteners 82 are also consistent with the lower fasteners 81 in composition.

The hydraulic buffer 5 can only be put up for use during maintenance. When the scissors lifting equipment works normally, the hydraulic buffer 5 does not take effect and can be directly removed via the lower connection end 6 and the upper connection end 7. However, there is usually no spare place on the equipment and it is too complicated to remove it after each use. Therefore, in this embodiment, preferably a storage box with an upward opening is arranged on a side wall of one scissors frame 42 towards the other scissors frame 42. When the lower fasteners 81 are loosened, the lower connection end 6 can move towards the scissors frame 42 with the storage box along the corresponding transverse support rod 41. The lower fasteners 81 are rotatable relative to the corresponding transverse support rod 41, such that the hydraulic buffer 5 falls into the storage box. During use, the hydraulic buffer 5 is usually positioned between the transverse support rods 41 for better support, while the storage box is arranged on the side wall of the corresponding scissors frame 42, which is a connection relationship of direct fixation. The closer they are, the stronger the firmness is, and the interference with the lifting mechanism 9 can be avoided. Therefore, during storage of the hydraulic buffer 5, the connection between the upper connection end 7 and the corresponding transverse support rod 41 is removed first, and then the nuts in the lower fasteners 81 are unscrewed, such that the lower opening and closing portions 63 no longer tightly hoop the corresponding transverse support rod 41; and the lower connection end 6 is movable or rotatable relative to the corresponding transverse support rod 41, and first moves towards the scissors frame 42 provided with the storage box until the hydraulic buffer 5 is aligned with the storage box, and then the lower connection end 6 rotates relative to the corresponding transverse support rod 41, such that the hydraulic buffer 5 falls into the storage box to achieve storage. Further, preferably a detachable cover plate is arranged at the opening of the storage box. When the hydraulic buffer 5 is stored in the storage box, the cover plate is installed to prevent the hydraulic buffer 5 from leaving the storage box to affect normal operation of the equipment.

Since the piston rod 52 will enter and exit from the hydraulic cylinder 51 when the hydraulic buffer 5 works, to prevent impurities from entering the hydraulic cylinder 51 via a gap to affect normal operation of the hydraulic cylinder 51, in this embodiment, preferably the hydraulic buffer 5 further includes a dust cover 53 sleeved at one end of the hydraulic cylinder 51, the dust cover 53 is fixed to the piston rod 52, the dust cover 53 is movable relative to the hydraulic cylinder 51 along with the piston rod 52, a circumferential side of the dust cover 53 surrounds one end of the hydraulic cylinder 51, one axial side thereof is sealed and fixed to the piston rod 52, and the other axial side thereof is open for the hydraulic cylinder 51 to extend into. In this way, the dust cover 53 can prevent the impurities from entering the hydraulic cylinder 51. The hydraulic buffer cylinder has one maximum load and will be damaged to be out of operation when this load is exceeded. Therefore, in this embodiment, preferably a warning scale is arranged on an outer wall of the hydraulic cylinder 51. When the dust cover 53 moves, a visible distance change is generated between the lower edge of the dust cover and the warning scale. When the lower edge of the dust cover 53 reaches the warning scale, the hydraulic buffer 5 reaches the maximum load. During use of the hydraulic buffer 5, firstly it is needed to lift up the scissors mechanism 4 with the lifting mechanism 9, such that a distance between the upper and lower adjacent transverse support rods 41 is greater than a total length of the hydraulic buffer 5 in an initial state; then the hydraulic buffer 5 is propped up from the storage box, and the upper arc groove 72 in the upper arc-shaped seat 71 of the upper connection end 7 is aligned with the upper transverse support rod 41; and then a descending functional module of the lifting mechanism 9 is turned on to drive the scissors mechanism 4 to retract and descend, the corresponding transverse support rod 41 enters the upper arc groove 72, and descending is continued such that the hydraulic buffer 5 supports the transverse support rods 41. In the process of continuing descending, it is needed to make the lifting mechanism 9 stop descending in time before the lower edge of the dust cover 53 exceeds the warning scale, so as to avoid damage to the hydraulic buffer 5. In this way, only the scissors mechanism 4 is pressed on the hydraulic buffer 5, which is usually the load that the hydraulic buffer 5 can bear.

However, in actual operation, an operator will forget to turn off the lifting mechanism 9 without paying attention, the lifting mechanism 9 continues descending, the hydraulic buffer 5 bears a pressure of the scissors mechanism 4 and a push force of the lifting mechanism 9, and when the lower edge of the dust cover 53 exceeds the warning scale, the hydraulic buffer 5 is damaged. Therefore, in this embodiment, preferably the scissors lifting equipment further includes the lifting mechanism 9, a controller, and a switch, where the lifting mechanism 9 is configured to support the scissors mechanism 4 and has an ascending functional module and a descending functional module that can push the scissors mechanism 4 to extend or retract; the switch is arranged on the hydraulic buffer 5 and can be triggered when the lower edge of the dust cover 53 reaches the warning scale; and the controller can receive a signal of the switch and control the lifting mechanism 9 to stop an action of descending, so as to avoid the damage to the hydraulic buffer 5. The lifting mechanism 9 is the linear actuator with the contact type safety nut described in Embodiment 1.

Based on the above scissors lifting equipment with the hydraulic buffer 5 for maintenance, the present disclosure provides a control method for the scissors lifting equipment with the hydraulic buffer 5 for maintenance, specifically a control method during maintenance, including the following steps:

S01: turning on the ascending functional module of the lifting mechanism 9 to drive the scissors mechanism 4 to extend until the distance between the two adjacent transverse support rods 41 in the up-down direction exceeds the total length of the hydraulic buffer 5 in the initial state;

S02: taking out the hydraulic buffer 5 from a storage position and propping up the hydraulic buffer, such that the upper connection end 7 of the hydraulic buffer 5 is aligned with the corresponding transverse support rod 41 of the scissors mechanism 4;

S03: turning on the descending functional module of the lifting mechanism 9 to drive the scissors mechanism 4 to retract, such that the corresponding transverse support rod 41 positioned above the hydraulic buffer 5 and closest to the upper connection end 7 moves towards the upper connection end 7 until being connected to the upper connection end 7;

S04: enabling the lifting mechanism 9 to continue driving the scissors mechanism 4 to retract, such that the transverse support rods 41 extrude the hydraulic buffer 5 to make the hydraulic buffer 5 gradually retract, and the lower edge of the dust cover 53 gradually approaches the warning scale; and S05: before the lower edge of the dust cover 53 exceeds the warning scale, turning off the descending functional module of the lifting mechanism 9 to stop the retraction of the scissors mechanism 4, where the hydraulic buffer 5 supports the scissors mechanism 4.

According to a further improvement of the above step S05, in step S05, when the lower edge of the dust cover 53 reaches the warning scale, the dust cover 53 is configured to trigger the switch, and the controller is configured to control the lifting mechanism 9 to turn off the descending functional module after obtaining the signal of the switch.

According to a further improvement, after step 505, the method further includes a step S06: after the descending functional module of the lifting mechanism 9 is turned off, enabling the controller to control the lifting mechanism 9 to turn on the ascending functional module, where a support force output by the ascending functional module can keep a static state of the scissors mechanism 4 together with the hydraulic buffer 5, such that the load of the hydraulic buffer 5 is reduced, and even in an extreme case of sudden failure of the hydraulic buffer 5, the lifting mechanism 9 can also play a supporting role, thereby further ensuring the safety.

The lifting mechanism 9 is used in the above control method, so it is aimed at maintaining parts other than the lifting mechanism 9. When the lifting mechanism 9 needs to be maintained, another control method is required. A control method for the scissors lifting equipment with the hydraulic buffer 5 for maintenance according to the present disclosure includes the following steps:

S01: hanging and pulling up the scissors mechanism 4 to extend the scissors mechanism 4 until the distance between the two adjacent transverse support rods 41 in the up-down direction exceeds the total length of the hydraulic buffer 5 in the initial state;

S02: taking out the hydraulic buffer 5 from a storage position and propping up the hydraulic buffer, such that the upper connection end 7 of the hydraulic buffer 5 is aligned with the corresponding transverse support rod 41 of the scissors mechanism 4;

S03: keeping the hanging and pulling of the scissors mechanism 4, gradually lowering the scissors mechanism 4 with a hanging and pulling force, and enabling the scissors mechanism 4 to retract, such that the corresponding transverse support rod 41 positioned above the hydraulic buffer 5 and closest to the upper connection end 7 moves towards the upper connection end 7 until being connected to the upper connection end 7;

S04: with continuous retraction of the scissors mechanism 4, enabling the hydraulic buffer 5 to gradually support the transverse support rods; and S05: removing the hanging and pulling force such that the scissors mechanism 4 is fully supported by the hydraulic buffer 5.

The hanging and pulling force in this control method is provided by hanging equipment.

The above descriptions are only the specific embodiments of the present disclosure, but the scope of protection of the present disclosure is not limited thereto. Any of those skilled in the art may easily think of various equivalent modifications or substitutions within the technical scope of the present disclosure, and these modifications or substitutions should be included in the scope of protection of the present disclosure. Therefore, the scope of protection of the present disclosure should be subject to the scope of protection of the claims.

What is claimed is:

1. A linear actuator with a contact safety nut, comprising a central screw, a driving nut mechanism, and a safety nut mechanism coupled to the driving nut mechanism, wherein the central screw has a screw raceway, the safety nut mechanism comprises a safety nut seat sleeved at the periphery of the central screw, limit hole channels pointing to the central screw are arranged on the safety nut seat along a circumferential direction of the safety nut seat, an elastic buffer element is arranged in each of the limit hole channels, a safety ball is arranged between the elastic buffer element and the central screw, the safety ball partially extends into the screw raceway to be partially positioned in the corresponding limit hole channel, and the safety ball is capable of rolling along the screw raceway and moving along the corresponding limit hole channel;

thread teeth are provided on an inner wall of the safety nut seat, and the thread teeth extend into the screw raceway and are spaced from the central screw.

2. The linear actuator with a contact safety nut according to claim 1, wherein the limit hole channels are filled with oil, and a cross-sectional diameter of each of the limit hole channels is consistent with a diameter of the safety ball.

3. The linear actuator with a contact safety nut according to claim 2, wherein the limit hole channels pass through inner and outer side walls of the safety nut seat, the safety ball blocks an outlet of the corresponding limit hole channel-close adjacent to the central screw, a plunger is detachably installed at an inlet of each of the limit hole channels far away from the central screw, the plunger blocks the inlet of the corresponding limit hole channel, and the elastic buffer element is positioned between the plunger and the safety ball.

4. The linear actuator with a contact safety nut according to claim 3, wherein a gap is provided between the safety nut seat and the driving nut mechanism, and forms an oil supplementing cavity, the oil supplementing cavity surrounds the central screw, and transfer hole channels for communication between the limit hole channels and the oil supplementing cavity are arranged in the safety nut seat.

5. The linear actuator with a contact type safety nut according to claim 1, wherein the limit hole channels are arranged in a circular array along the circumferential direction of the safety nut seat.

6. The linear actuator with a contact safety nut according to claim 5, wherein outlets of all the limit hole channels are arranged on the thread teeth along a screw extension direction of the thread teeth.

7. The linear actuator with a contact safety nut according to claim 1, wherein the elastic buffer element is a spring, and a diameter of the spring is smaller than a diameter of the safety ball.

8. An aerial work platform, comprising the linear actuator with a contact type safety nut according to claim 4.

* * * * *